United States Patent [19]
Fujii et al.

[11] 4,319,539
[45] Mar. 16, 1982

[54] CUSHIONING FENDER ASSEMBLY

[75] Inventors: Masaru Fujii, Ashiya; Tomokazu Kashiwara; Tetsuo Yamaguchi, both of Nishinomiya, all of Japan

[73] Assignee: Sumitomo Rubber Industries, Ltd., Hyogo, Japan

[21] Appl. No.: 972,830

[22] Filed: Dec. 26, 1978

[30] Foreign Application Priority Data

Jul. 12, 1978 [JP] Japan .................... 53/96711[U]

[51] Int. Cl.³ .................. B63B 21/00; E02B 3/22; F16F 7/12
[52] U.S. Cl. ............................ 114/219; 267/140; 293/136; 405/215
[58] Field of Search ............ 114/219; 405/211, 212, 405/215; 293/136; 267/140, 153

[56] References Cited

U.S. PATENT DOCUMENTS

| 3,600,896 | 8/1971 | Tateisi et al. | 405/215 |
| 3,690,280 | 9/1972 | Narabu | 114/219 |
| 3,708,988 | 1/1973 | Miura | 405/215 |
| 3,788,802 | 1/1974 | Narabu | 405/215 |
| 3,820,495 | 6/1974 | Ueda | 405/215 X |
| 3,948,500 | 4/1976 | Korbuly et al. | 405/215 X |
| 3,948,501 | 4/1976 | Schwemmer | 405/215 X |

FOREIGN PATENT DOCUMENTS

| 49-34319 | 9/1974 | Japan . | |
| 7706176 | 7/1977 | Netherlands | 405/215 |
| 1241315 | 8/1971 | United Kingdom | 405/215 |

Primary Examiner—Charles E. Frankfort
Attorney, Agent, or Firm—Birch, Stewart, Kolasch & Birch

[57] ABSTRACT

A cushioning fender assembly for cushioning the impact or shock applied from an impact applying element to an impact receiving element which comprises an elongated impact receiving member of rigid material and at least one pair of elastically deformable fenders. Each of the fenders comprises an elongated body of one-piece construction having a buffer block having an outer surface formed integrally with a shoulder portion protruding outwards therefrom in a direction parallel to the buffer block, and a support wall constituted by a leg section depending from the buffer block in a direction away from the buffer block and a heel section on one side of the leg section remote from the buffer block and having a fitting flange outwardly protruding therefrom in a direction opposite to the direction of protrusion of the shoulder portion and in parallel to the shoulder portion. The respective fenders are rigidly connected to the impact receiving member with the shoulder portions anchored thereto.

2 Claims, 8 Drawing Figures

10% Compressed

20% Compressed

30% Compressed

60% Compressed

CUSHIONING FENDER ASSEMBLY

BACKGROUND OF THE INVENTION

The present invention relates to a cushioning fender assembly adapted to be mounted on one or both of the hull of a relatively large ship and a shore installation such as pier, wharf, quay, dock, float or the like structure for cushioning the impact of the ship against the shore installation.

Various types of elastically deformable fenders have long been used to cushion the impact of the ship against the shore installation for protecting both the boardside of the ship and such shore installation. By way of example, the British Patent No. 945,456, published on Jan. 2, 1964 discloses an elastically deformable fender of a construction comprising a hollow rubber tube of trapezium-shaped cross section with a fitting surface, a buffer surface opposite the fitting surface and a pair of support walls between the fitting and buffer surfaces, the section of the tube in a plane at right angles to the longitudinal axis of the tube having the approximate form of an isosceles trapezoid with its top forming said buffer surface, the bottom forming said fitting surface and the two lateral sides of equal length forming said supporting walls. This British patent specification further discloses that the fender of the above described construction can attain a maximum performance if the trapezium forming the cross sectional shape of the hollow rubber tube satisfies the following requirements:

$A = H$ to $3H$, $B = 0.2H$ to $0.8H$, $t = 0.15H$ to $0.4H$, and $\theta = 45°$ to $80°$ wherein H is the height as measured between the top and the bottom, A is the bottom width, B is the top width, t is the wall thickness of each of the support walls, and $\theta$ is the angle of each of the lateral sides relative to the bottom.

U.S. Pat. No. 3,418,815 discloses a fender of a construction comprising a hollow elastic tube similar to that disclosed in the above mentioned British patent specification, but has a rigid plate embedded in the buffer surface portion for optimum load-distribution both on the side of the ship and throughout the elastic material to produce improved energy-absorbing characteristics. The use of an additional rigid plate embedded in the fitting surface portion of the hollow elastic tube is also disclosed therein.

U.S. Pat. No. 3,418,816, patented on Dec. 31, 1968, discloses a fender assembly constituted by a plurality of fenders each being substantially identical with the disclosed in the above mentioned U.S. Pat. No. 3,418,815.

In addition, an elastically deformable fender of a construction having a substantially V-shaped cross section is well known. This known V-shaped fender comprises a pair of elongated support walls of equal width connected integrally at one side edge with each other by a buffer block, said buffer block having a flat buffer surface facing in a direction remote from fitting flanges which extend respectively from the other side edges of the associated support walls in a direction away from each other and in parallel to the plane of the buffer surface. This fender is of one-piece construction made of an elastic material such as rubber.

On the other hand, an elastic fender disclosed in the U.S. Pat. No. 3,820,495, patented on June 28, 1974, is considered an improved version of the above described V-sectioned fender in terms of the energy absorbability and is similar in construction to that V-sectioned fender except for a fluted groove and a fluted rib which are provided in the buffer block of the fender of the last mentioned U.S. patent. This last mentioned U.S. patent also discloses the use of rigid reinforcement plates each embedded in the corresponding fitting flange.

According to the last mentioned U.S. patent, the fluted rib extending lengthwise of the fender and protruding into a space between the supporting walls from the inside surface of the buffer block opposite to the buffer surface is so designed that, when the fender is extensively collapsed with the supporting walls outwardly buckled with respect to each other, said rib can abut on the shore installation to support the buffer block together with the buckled support walls for absorbing further shorck energy. On the other hand, the fluted groove extending lengthwise of the fender and defined in the buffer surface of the buffer block opposite to the fluted rib, thereby dividing the buffer surface into buffer areas one on each side of the fluted groove, is so designed that, as the fender is elastically collapsed, the buffer areas on respective sides of the fluted groove move in a direction close towards each other, while slip takes place between the boardside of the slip and each buffer area, thereby avoiding the possible outward expansion of of that portions of the fender where the support walls are integrally connected to the buffer block, so that the time at which each of the support walls starts its buckling movement under the influence of the impact applied thereto can be delayed.

The fender of the construction disclosed in the last mentioned U.S. patent can, in fact, exhibit an improved energy absorbability in view of the fact that the time at which each of the support walls starts its buckling movement can be delayed by the provision of the fluted groove. However, in practice, since the coefficient of friction between the buffer areas of the fender and the boardside of the ship is not always fixed and varies depending on the type of ships and/or the surface condition of the buffer areas, the movement of the buffer area on respective sides of the fluted groove in a direction close towards each other which takes place as the fender is collapsed by the application of a load thereto from the ship is not always stable and is likely to be facilitated where such frictional coefficient is low while to be retarded where it is high.

The Japanese Utility Model Laid-open Publication No. 49-34319, laid open to public inspection in 1974, the invention of which has been assigned to the same assignee of the present invention disclosed herein, discloses a fender assembly constituted by at least one pair of elastically deformable support columns, each being of a substantially I-shaped cross section, and a buffer member bridging or straddling these support columns. This fender assembly is advantageous in that not only can the possibility of damage to the boardside of the ship upon contact of the latter to the fender assembly be substantially eliminated, but also the fender assembly effectively serves to cushion the impact applied by a relatively large vessel.

However, all of the prior art fenders discussed hereinabove have a common disadvantage in that the energy absorbability is relatively low and, therefore, a relatively large amount of repulsive forces tends to be generated from the fender earlier than expected.

SUMMARY OF THE INVENTION

Accordingly, the present invention has for its essential object to provide an improved fender assembly, which can exhibit an improved energy absorbability as compared with that of any one of the prior art fenders hereinbefore discussed.

Another important object of the present invention is to provide an improved fender assembly of the type referred to above which can satisfactorily and effectively cushion the impact applied thereto from any direction.

A further object of the present invention is to provide an improved fender assembly of the type referred to above, which has a cushioning capability variable with the magnitude of an impact applied thereto.

A still further object of the present invention is to provide an improved fender assembly of the type referred to above, which can readily and easily be manufactured without requiring any complicated procedure and without substantially requiring the use of an manufacturing equipment specially designed for the production of the fender assembly of the present invention.

To this end, there is provided an improved fender assembly which comprises an elongated impact receiving member made of such a rigid material as wood or metal, at least one surface area of said impact receiving member, where an impact or shock is applied, being provided thereon with an elastic pad, and at least a pair of elastically deformable fenders of the same construction connected to said impact receiving member and extending therefrom so as to diverge from each other in a direction away from the impact receiving member. In accordance with the present invention, each of the elastically deformable fenders generally comprises an elongated body of one-piece construction made of an elastic material and including a buffer block of substantially rectangular cross section, having an outer surface formed integrally with a shoulder portion protruding outwards therefrom in a direction parallel to said buffer block, and a support wall constituted by a leg section extending from said buffer block in a direction away from said buffer block and a heel section on one side of the leg section remote from the buffer block and having a fitting flange outwardly protruding therefrom in a direction opposite to the direction of protrusion of the shoulder portion and in parallel relation to said shoulder portion.

The respective fenders each being of the construction as hereinabove described are rigidly connected to the impact receiving member with the shoulder portions anchored to an undersurface of the impact receiving member. The fenders so connected to the impact receiving member extend outwards therefrom so as to diverge from each other with the fitting flanges of the respective fenders extending outwards with respect to each other in parallel to the plane of any one of the undersurface of the impact receiving member.

In each of the elastically deformable fenders forming the fender assembly of the present invention together with the impact receiving member, the leg section of the corresponding support wall has a uniform thickness while the heel section has a varying thickness gradually increasing in a direction away from the associated leg section. More specifically, in the assembled condition, the angle of divergence of the support walls in the direction away from the impact receiving member is so selected that the leg section of each support wall can form an angle within the range of 55° to 80° relative to the fitting surface plane, on which the surface area of contact of the corresponding fitting flange to an impact receiving element, for example, the shore installation, lies whereas the heel section contiguous to such leg section has an outer face in flush with an outer face of the leg section and an inside face lying at an angle within the range of 75° to 90° relative to said fitting surface plane. The value of the angle of divergence of the support walls in the direction away from the impact receiving member for each leg section always being substantially less than the value of the angle of the inside face of the heel section relative to the fitting surface plane, so as to provide a distinct heel section.

Furthermore, according to the present invention, the thickness of the buffer block of each of the elastically deformable fenders is preferably within the range of $(0.15 \times H)$ to $(0.35 \times H)$, H representing the height of any one of the fenders, while the boundary between the respective inside faces of the leg and heel sections in each fender is located at a level spaced a height within the range of $(0.15 \times H)$ to $(0.4 \times H)$ as measured from the fitting surface plane.

In addition, one or both of the shoulder portion and the fitting flanges, both in each fender, may have a rigid reinforcement plate embedded therein.

BRIEF DESCRIPTION OF THE DRAWINGS

These and other objects and features of the present invention will become apparent from the following description taken in conjunction with a preferred embodiments thereof with reference to the accompanying drawings, in which.

DETAILED DESCRIPTION OF THE INVENTION

Figure 1:
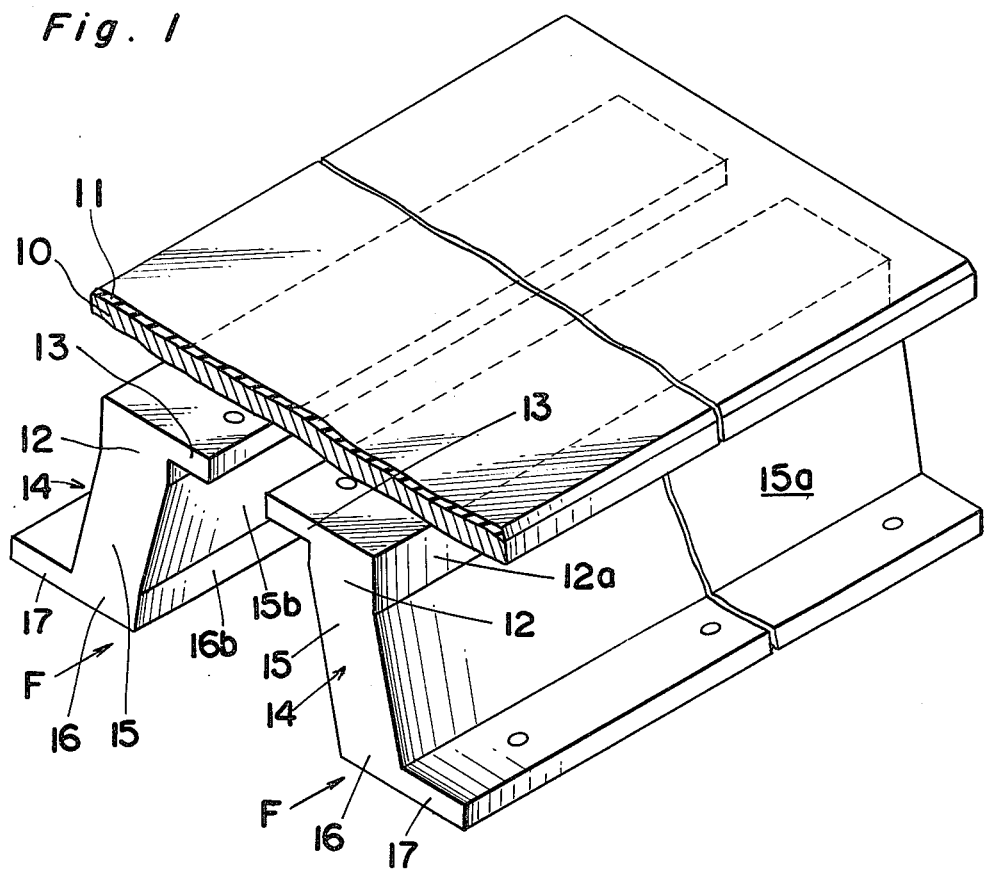
FIG. 1 is a schematic perspective view, with a portion broken away, of a fender assembly embodying the present invention.

Before the description of the present invention proceeds, it is to be noted that like parts are designated by like reference numerals throughout the accompanying drawings.

Figure 2:
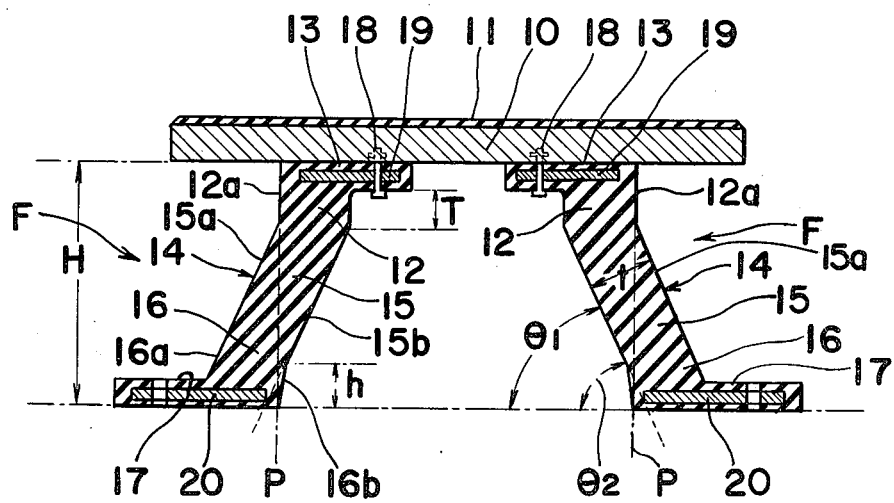
FIG. 2 is a cross sectional view of the fender assembly shown in FIG. 1.

Referring now to FIGS. 1 and 2, a fender assembly adapted to be mounted on, for example, a shore installation for cushioning the impact or shock given thereto by the hull of a ship approaching the shore installation comprises an elongated impact receiving or abutment plate 10 made of such a rigid material as wood or metal, at least one surface of said abutment plate 10 where the impact or shock is applied being provided with an elastic pad 11, and at least one pair of elastically deformable fenders of the same construction made of an elastic material and extending therefrom so as to diverge from each other in a direction away from the abutment plate 10.

Each of the elastically deformable fenders generally comprises an elongated body F of one-piece construction made of an elastic material and including a buffer block 12 of substantially rectangular cross section, having an outer surface formed integrally with a shoulder portion 13 protruding outwards therefrom in a direction parallel to said buffer block 12, and a support wall 14 constituted by a leg portion 15 extending from said buffer block 12 in a direction away from said buffer block 12 and a heel section 16 on one side of the leg section 15 remote from the buffer block 12 and having a fitting flange 17 outwardly protruding therefrom in a direction opposite to the direction of protrusion of the shoulder portion 13 and in parallel relation to said shoulder portion 13.

The respective fender bodies F, each being of the construction as hereinabove described are rigidly connected to the abutment plate 10 with the shoulder portions 13 anchored to an undersurface of the abutment plate 10 opposite to the elastic pad 11 by means of a plurality of anchor bolts 18. In order to give a rigidity, a reinforcement plate 19 is shown to be embedded in each of the shoulder portions 13, allowing the anchor bolts 18 to pass therethrough.

The fender bodies F so connected to the abutment plate 10 extend outwards therefrom so as to diverge from each other with the fitting flanges 17 of the respective fender bodies F extending outwards with respect to each other in parallel to the plane of any one of the undersurface of the abutment plate 10.

Figure 3:
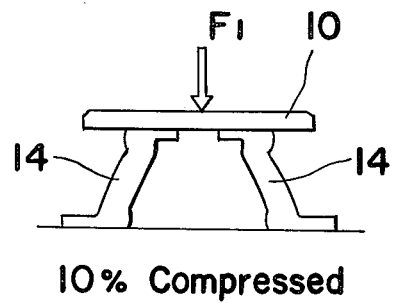
FIGS. 3(a) to 3(d) are schematic end views of the fender assembly, showing the sequence of elastic deformation or collapse of the fender assembly incident to the application of an impact thereto.
Figure 3:
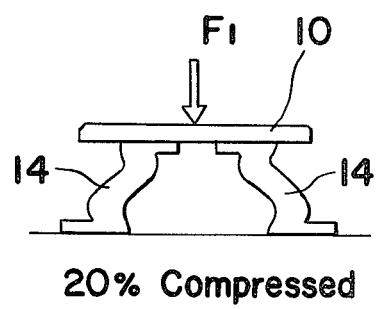
Figure 3:
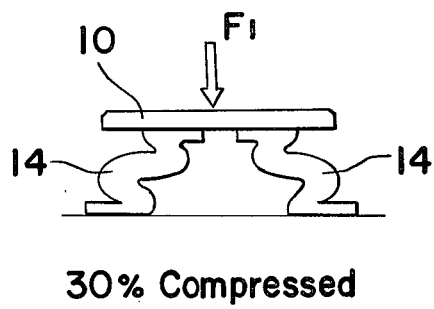
Figure 3:
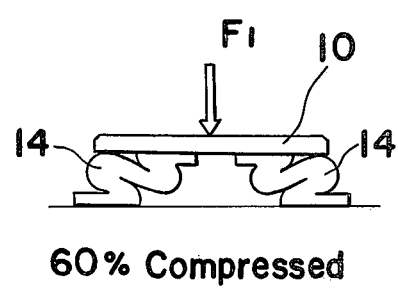

The fender assembly according to the present invention is so designed that, when the impact is applied thereto through the abutment plate 10 in a direction shown by $F_1$ in FIG. 3, the fender bodies F can, after having been inwardly compressed in a sequential manner as shown in FIGS. 3(a) and 3(b), be forced to buckle substantially outwardly with respect to each other as shown in FIG. 3(c) and finally buckled as shown in FIG. 3(d) to develop rapidly a maximum amount of reaction force.

In order to delay for a substantially prolonged period of time, the time at which respective portions of the fender bodies F, at which the support walls 14 are buckled outwardly with respect to each other under the influence of the impact, contact the undersurface of the abutment plate 10 in a manner as shown in FIG. 3(d), each of the buffer blocks 12 has a thickness T preferably within the range of $(0.15 \times H)$ to $(0.35 \times H)$, H representing the height of any one of the fender bodies F. In practice, the thickness T of each of the buffer blocks 12 is to be selected in consideration of the wall thickness of the leg section of the corresponding support wall, the height H of the corresponding fender body F and/or the height h of the heel section of the corresponding support wall 14 as measured from the boundary between an inside face 15b of the leg section and an inside face 16b of the heel section to a fitting surface plane in which surface areas of contact of the fitting flanges 17 to the shore installation lie. In addition, while the leg section 15 of the corresponding support wall 14 of each of the fender bodies F has a uniform thickness, the associated heel section 16 has a varying thickness gradually increasing in a direction away from the leg section 15. More specifically, in the assembled condition, the angle of divergence of the support walls 14 in the direction away from the abutment plate 10 is so selected that the leg section 15 of each support wall 14 can form an angle $\theta_1$ within the range of 55° to 80° relative to the above described fitting surface plane, while the heel section 16 contiguous to such leg section 15 has an outer face 16a held in flush with an outer face 15a of the leg section and an inside face 16b lying at an angle $\theta_2$ within the range of 75° to 90° relative to said fitting surface plane. The value of the angle of divergence of the support walls in the direction away from the impact receiving member for each leg section always being substantially less than the value of the angle of the inside face of the heel section relative to the fitting surface plane, so as to provide a distinct heel section.

By carefully selecting the thickness of each buffer block 12 and the angles $\theta_1$ and $\theta_2$ in the manner described above, the time at which that portion of the respective fender bodies F at which the latters are buckled outwardly with respect to each other in the manner shown in FIG. 3(d) contact the undersurface of the abutment plate 10 can advantageously be delayed. However, if the boundary between the inside face 15a of the leg section of each of the support wall 14 and the inside face 16a of the heel section of such support wall 14 is located at a level spaced a height h within the range of $(0.15 \times H)$ to $(0.4 \times H)$ as measured from the fitting surface plane, the outward buckling movement of the support walls 14 can be assured advantageously.

It is to be noted that when it is stated that the time at which that portions of the respective support walls 14 contact the undersurface of the abutment plate 10 can be delayed, it is meant that the fender assembly of the present invention can absorb a relatively large amount of impact or shock energies.

Preferably, the fitting flanges 17 are positioned outwardly of respective planes P, in which outer faces 12a of the associated buffer blocks 12 lie, so that generation of a relatively large amount of reaction forces, which may take place subsequent to the buckling of the support walls 14, can be suppressed, thereby allowing the support walls 14 to be largely deformed or collapsed with a relatively large amount of energies absorbed.

Each of the fitting flanges 17 may have a rigid reinforcement plate 20 embedded therein to provide a rigidity to the corresponding fitting flange 17.

Figure 4:
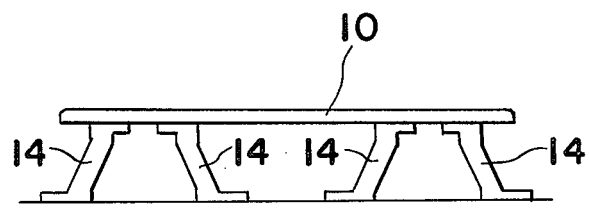
FIGS. 4 and 5 are schematic end views showing further preferred embodiments of the present invention, respectively.
Figure 5:
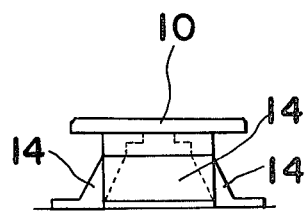

It is to be noted that the number of pairs of the fender bodies F for each abutment plate 10 may not be always limited to one such as shown, but may be two or more depending upon the size of the abutment plate as shown in FIG. 4. In this case, the pairs of the fender bodies F may be positioned in spaced relation to each other in a direction either lengthwise or widthwise of the abutment plate 10. In addition, as shown in FIG. 5, three or four fender bodies may be employed for each abutment plate 10.

Although the present invention has been fully described in connection with the preferred embodiments thereof with reference to the accompanying drawings, it is to be noted that various changes and modifications are apparent to those skilled in the art. By way of example, an outer face 16a of the heel section 16 of each of the support walls 14 may be inclined relative to the plane of the outer faces 15a of the associated leg section 15. Therefore, such changes and modifications are to be understood as included within the true scope of the present invention.

We claim:

1. A fender assembly adapted to be mounted on one or both of an impact applying element and an impact receiving element for cushioning the impact applied from the impact applying element to the impact receiving element, said fender assembly comprising an elongated impact receiving member made of a rigid material and at least one pair of elastically deformable fenders of the same construction connected to said impact receiving member and extending therefrom so as to diverge from each other in a direction away from the impact receiving member, each of said elastically deformable fenders including an elongated body of one-piece construction made of an elastic material and further including a buffer block of substantially rectangular cross section extending at right angles to the plane of the impact receiving surface, said buffer block having an outer surface formed integrally with a shoulder portion protruding outwards therefrom in a direction parallel to said buffer block, said buffer block having a thickness of 0.15 to 0.35H, wherein H represents the height of said fender and said shoulder portion having a reinforcement plate embedded therein and a support wall constituted by a leg section extending from said buffer block in a direction away from said buffer block and a heel section on one side of the leg section remote from the buffer block and having a fitting flange outwardly protruding therefrom in a direction opposite to the direction of protrusion of the shoulder portion and in parallel to said shoulder portion, said fitting flange having a reinforcement plate embedded therein, said respective fenders being rigidly connected to the impact receiving member with the shoulder portions anchored thereto, said leg section in each of the elastically deformable fenders having a uniform thickness while said heel section of each of the elastically deformable fenders has a varying thickness gradually increasing in a direction away from the corresponding leg section and wherein the angle of divergence of the support walls in the direction away from the impact receiving member is so selected that the leg section of each support wall forms a first angle within the range of 55° to 80° relative to a fitting surface plane, on which a surface of contact of the corresponding fitting flange to the impact receiving element lies whereas the heel section contiguous to such leg section has an outer face flush with the outer face of the leg section and an inside face lying at a second angle within the range of 75° to 90° relative to said fitting surface plane, the value of said first angle always being substantially less than the value of said second angle to provide a distinct heel section, and wherein the boundary between the respective inside faces of the leg and heel sections in each fender is located at a level spaced at a height within the range of 0.15 to 0.4H as measured from the fitting surface plane.

2. The fender assembly as claimed in claim 1 wherein at least one surface area of said impact receiving member, that being the surface where the impact or shock is applied, is provided with an elastic pad.

* * * * *